Figure 1:
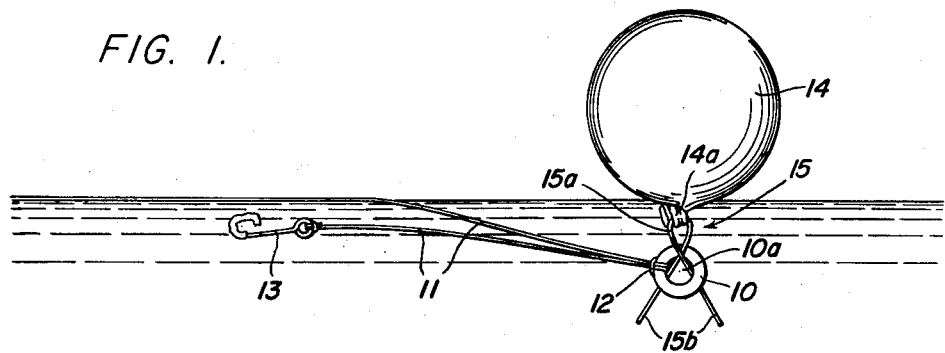

Nov. 8, 1960

W. E. ADAMS 2,958,976

FISH LURE PLACEMENT APPARATUS

Filed Oct. 29, 1958

INVENTOR.
WILLIAM E. ADAMS

BY *Mallinckrodt and Mallinckrodt*

ATTORNEYS

United States Patent Office 2,958,976  
Patented Nov. 8, 1960

2,958,976

FISH LURE PLACEMENT APPARATUS

William E. Adams, 1020 N. 14th West,
Salt Lake City, Utah

Filed Oct. 29, 1958, Ser. No. 770,423

4 Claims. (Cl. 43—43.12)

This invention relates to the art of fishing for sport, and is concerned with providing apparatus for floating a fish line, equipped with a baited hook or other lure, to a spot remote from shore or such other place as a fisherman may be located, as, for example, a boat, bridge, or causeway.

It is not always possible for a fisherman to cast to a likely-looking spot for dropping his hook. Accordingly, a primary objective of this invention is to provide simple and inexpensive apparatus enabling him to float his lure and line to a spot remote from where he is located and to drop them at that spot.

A feature of the invention is a unique combination of float, ring, and resilient fastener, in which the ring is securely attached to the line and the fastener to the float, the ring being releasably attached to the fastener so that inertia of the float will enable the ring to be easily freed from the fastener by means of a quick jerk on the line.

In accordance with the invention, the fastener is advantageously a length of wire looped intermediate its length to provide crossed, elongate legs, which diverge outwardly from their point of crossing at the closing of the loop. The float, which is advantagously an inflated toy balloon, is secured to the loop portion of the fastener, while the divergent legs are pressed together and slipped through the ring, expanding thereafter due to the resiliency of the wire to temporarily lock float and ring together. After the float has carried the line and baited hook to a desired spot remote from the fisherman holding the line, it is only necessary for such fisherman to sharply pull the line in order to jerk the ring free from the fastener, leaving the float and fastener to drift where they will. Their replacement value is so slight that recovery is unnecessary.

The ring may be an ordinary steel washer when it is desired that the baited hook sink at the selected spot where the line is separated from the float. On the other hand, it may be of light plastic or any one of various stiff and floatable materials when it is desired that the hook remain at or near the surface following its release from the float.

An inflated toy balloon is especially desirable as the float in most instances, because of the possibility of using off-shore breezes to carry the hook and line out from the shores of lakes and streams.

Further objects and features of the invention will become apparent from the following detailed description of the presently preferred specific form illustrated in the accompanying drawing.

Figure 2:
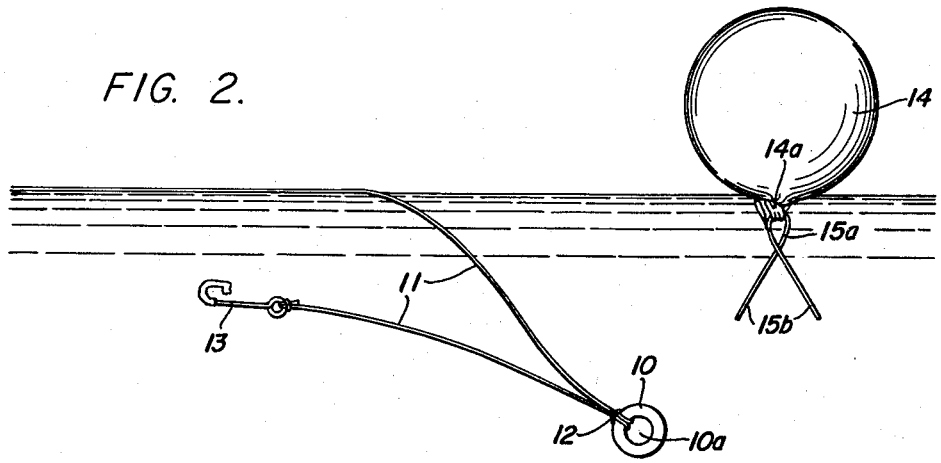
Figure 3:
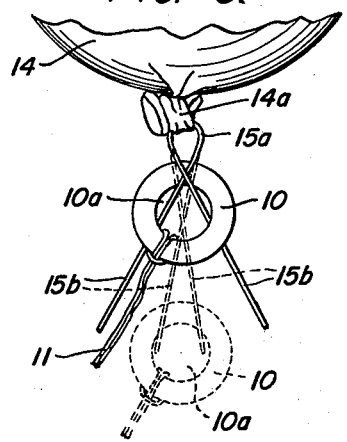
Figure 4:
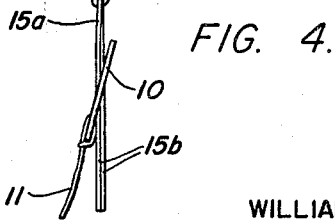

In the drawing:

Fig. 1 represents a side elevation of the apparatus as it is being floated out for placement of the lure;

Fig. 2, a corresponding view showing the apparatus immediately following the fisherman's jerking his line to release the float and fastening device;

Fig. 3, a fragmentary part of Fig. 1 drawn to an enlarged scale and showing in dotted lines how a jerk on the line releases the ring from the fastening device; and Fig. 4, a side elevation of the structure shown in Fig. 3.

Referring to the drawing:

In the illustrated form of the invention, the fish lure placement apparatus comprises a ring 10, which the fisherman secures to his line 11 by the customary slip knot 12 at a location adjacent to the lure, here shown as a worm-baited hook 13.

The ring 10 may be of various water resistant materials, which are reasonably stiff so as to retain the ring formation at all times during use of the device. Metal or plastic is preferred.

The apparatus also includes a float, here shown as a toy balloon 14, secured to a jerk-release fastener 15 for releasably attaching it to the ring 10.

As here shown, the fastener 15 is formed from a length of stiff wire having sufficient resiliency and flexibility for the purpose. It is looped intermediate its length to provide a closed loop member 14a, preferably having a diameter greater than the opening 10a through ring 10, and crossed, elongate legs 15b which serve as jerk-release fastening means. Such legs diverge outwardly from their point of crossing at the closing of loop portion 15a, so as to perform their fastening function when passed through the opening in ring 10.

As indicated in Fig. 3, both the insertion of divergent legs 15b into the opening of ring 10 and release thereof from such legs are permitted by their ability to contract inwardly and expand outwardly of the longitudinal central axis of such fastener.

In setting up the apparatus for use, the toy balloon 14 is inflated in the usual manner and secured to loop member 15a of fastener 15 by knotting the neck portion 14a around the back of the loop, as shown. The fastener 15 is then attached to ring 10 by pressing the legs 15b together and inserting them through the opening in the ring, thereafter releasing them and permitting them to expand into the locking position shown in Figs. 1 and 3.

The fisherman need now only place the hook end of his fish line, with the apparatus attached as described, upon the surface of the water near wherever he wishes to station himself while waiting for a bite. Due to either off-shore current or breeze, or both, the natural tendency will be for the float 14 to carry the baited hook out into deep water. When an appropriate spot for fishing has been reached by the float, the fisherman need only jerk the line 11, which, of course, is attached to reel and pole (not shown) in usual manner, to effect release of such line from the float.

As is indicated in Fig. 3, such a jerk on the line will pull ring 10 free from fastener 15 by contracting the legs 15b of the fastener.

The ring 10 should be of heavy metal, such as an ordinary steel washer, when it is desired that the lure sink through the water, and should be of light metal or plastic when it is desired that the lure remain near the surface.

The toy balloon 14 and fastener 15 are expendable, because of their low cost. They will be left to drift as they may, following their release from the fishing line.

Whereas this invention is here illustrated and described with respect to a presently preferred specific construction, it should be realized that various changes may be made without departing from the generic inventive concepts disclosed.

I claim:

1. Fish lure placement apparatus, comprising a ring of stiff and water-resistant material adapted to be attached to a fishing line; a resilient, expansible fastener made up from a length of wire looped upon itself intermediate its length to provide a loop member and elongate legs diverging outwardly from said loop member and adapted to be temporarily contracted and inserted through the opening of said ring as jerk-release fastening means; and a disposable float adapted for attachment to said loop member of the fastener.

2. The apparatus of claim 1, wherein the float is a toy balloon.

3. In combination with a fishing line equipped with hook and lure, a lure placement apparatus, comprising a ring of stiff and water resistant material attached to the fishing line at a location near the lure; a resilient, expansible fastener made up from a length of wire looped upon itself intermediate its length to provide a loop member and elongate legs diverging outwardly from said loop member and adapted to be temporarily constructed and inserted through the opening in said ring, said legs passing through the opening in said ring as jerk-release fastening means; and a disposable float attached to said loop member of the fastener.

4. The apparatus of claim 3, wherein the float is a toy balloon.

References Cited in the file of this patent

UNITED STATES PATENTS

| | | |
|---|---|---|
| 1,564,147 | Stickley et al. | Dec. 1, 1925 |
| 2,121,279 | Beck | June 21, 1938 |
| 2,597,288 | Caldwell | May 20, 1952 |

OTHER REFERENCES

Popular Mechanics Magazine, August 1950, page 10.